United States Patent [19]
Beck et al.

[11] Patent Number: 6,077,435
[45] Date of Patent: Jun. 20, 2000

[54] FILTRATION MONITORING AND CONTROL SYSTEM

[75] Inventors: Thomas William Beck; Humphrey John Jardine Drummond, both of Windsor; Ian Andrew Maxwell, Leichhardt; Warren Thomas Johnson, Bligh Park; Brett Kensett-Smith, Beecroft, all of Australia

[73] Assignee: USF Filtration and Separations Group Inc., Timonium, Md.

[21] Appl. No.: 08/913,901

[22] PCT Filed: Mar. 15, 1996

[86] PCT No.: PCT/AU96/00144

§ 371 Date: Jan. 12, 1998

§ 102(e) Date: Jan. 12, 1998

[87] PCT Pub. No.: WO96/28236

PCT Pub. Date: Sep. 19, 1996

[51] Int. Cl.$^7$ .......................... B01D 61/22; B01D 35/143; G01N 15/08

[52] U.S. Cl. .................... 210/636; 95/19; 95/23; 210/108; 210/321.69; 210/739; 210/741; 73/38

[58] Field of Search ............... 210/90, 103, 108, 210/134, 135, 138, 139, 140, 141, 142, 143, 257.1, 257.2, 321.69, 333.01, 500.3, 636, 637, 650, 739, 741, 791, 96.1, 96.2; 73/38, 40; 96/421, 422, 425, 428; 95/19, 20, 23

[56] References Cited

U.S. PATENT DOCUMENTS

| | | | |
|---|---|---|---|
| 3,992,301 | 11/1976 | Shippey et al. | 210/321.69 |
| 4,688,511 | 8/1987 | Gerlach et al. | 116/268 |
| 4,767,539 | 8/1988 | Ford | 210/636 |
| 4,793,932 | 12/1988 | Ford et al. | 210/636 |
| 4,921,610 | 5/1990 | Ford et al. | 210/636 |
| 4,931,186 | 6/1990 | Ford et al. | 210/636 |
| 5,066,402 | 11/1991 | Anselme et al. | 210/636 |
| 5,198,116 | 3/1993 | Comstock et al. | 210/636 |
| 5,320,760 | 6/1994 | Freund et al. | 210/741 |
| 5,643,455 | 7/1997 | Kopp et al. | 210/636 |

FOREIGN PATENT DOCUMENTS

| | | |
|---|---|---|
| 34400/84 | 4/1985 | Australia . |
| 77066/87 | 2/1988 | Australia . |
| 55847/86 | 9/1996 | Australia . |
| 41 17 422 C 1 | 11/1992 | Germany . |
| 6071120 | 3/1994 | Japan . |
| 2 253 572 | 9/1992 | United Kingdom . |
| 2 278 295 | 11/1994 | United Kingdom . |
| WO 9607470 A1 | 3/1996 | WIPO . |

*Primary Examiner*—Joseph W. Drodge
*Attorney, Agent, or Firm*—Knobbe, Martens, Olson & Bear LLP

[57] ABSTRACT

A method and apparatus for determining the fouling effect of a feedstream on a filter having known characteristics disclosed. The method comprises passing the feedstream through a filter (5) having known characteristics; determining the change in resistance to flow of the feedstream across the filter, either continuously or over a number of time intervals and from this data, calculating a feed fouling index (FFI) representative of the fouling characteristics of the feedstream with respect to the filter. A method and apparatus for monitoring the operation of a filtration system is also disclosed the method comprising sampling system parameter values at selected locations within the filtration system at a predetermined sampling rate; generating a parameter profile characteristic from the sampled parameter values at predetermined intervals of time; and analysing the parameter profile characteristic to determine correct operation of the filtration system. A further method and apparatus of monitoring and controlling a filtering system based on backwash efficiency is also disclosed, the method comprising determining resistance values of filtering elements used in the filtering system at predetermined times during the backwash cycle of the system by monitoring a number of operating parameters of the system; calculating a backwash efficiency value representative of the efficiency of the backwash cycle of the filtering system using the resistance values determined; and controlling the operation of the filtering system in dependence on the value of the backwash efficiency calculated.

28 Claims, 13 Drawing Sheets

FILTRATION MONITORING AND CONTROL SYSTEM

TECHNICAL FIELD

The present invention relates to ultrafiltration and microfiltration systems and in particular to testing, monitoring and control systems for use with membrane filtering systems.

Although the invention is described with respect to its application to fibre membrane filtering systems, it will be appreciated that it is applicable to ultrafiltration/microfiltration systems in general and is not limited to the specific application described.

BACKGROUND ART

Fibre membrane filtration is a well developed method which involves the use of a large number of hollow tubular micro-porous fibres. Each fibre is adapted to allow filtrate to flow from the exterior of the fibre through micro-pores in the fibre wall to the interior of the fibre, while excluding impurities from the filtrate. The pores can be, for example, around 0.2 micrometers in diameter.

In practice, many thousands of fibres are bundled together and encased in a shell, the complete assembly being known as a module 5 (see FIG. 2). The shell 6 is usually cylindrical and the fibres 7 extend longitudinally therethrough. The ends of the shell are sealed, usually with a resin or the like known as the potting forming a plug 8 at each end. The ends of the hollow fibres 7 extend through, and are encased in the potting plug 8 so that the interior of each of the fibres 7 is in communication with the exterior of the module 5 at both ends, thereby allowing filtrate to be removed from two end locations. Alternatively, both ends of each fibre may extend through the potting and communicate with the exterior at one end of the module 5, or the fibres at one end may extend through the potting, the other fibre ends being sealed.

As shown in FIG. 1, the modules 5 are usually (but not necessarily) disposed in "banks" 9, each comprising a row of modules 5 sharing a manifold 10, the banks being arranged in an array.

In use, feed or influent is introduced to the space intermediate the exterior of the fibres and the interior of a module shell. Filtrate flows through the micro-porous membrane of the fibres 7 into the interior of the fibres and thereafter flows along the length of the fibres passing through the plug 8 to the exterior of the module 5, usually into a manifold.

The operation of the filtering system is normally controlled by a number of valves 11 which control the flow of feed to the system, the flow of filtrate, backwashing of the filters using gas and/or filtrate, and introduction of wetting agents and special chemical cleaning agents during backwashing. These valves 11 are typically pneumatically operated by compressed air, with the flow of compressed air to each valve being controlled by an electrically operated solenoid.

Operation of the system may be monitored by detectors which measure fluid flow, fluid pressure, temperature and other parameters at various points throughout the system. Feedback loops may be built into the system to ensure the system is operating according to preset control conditions.

During use the fibres become clogged with the filtered impurities and require "backwashing" at regular intervals to remove the impurities and maintain the efficiency of the filtering. The frequency and type of backwashing will be dependent on the state and type of feedstream being filtered. FIG. 3 illustrates flux decline with various types of feed. In many situations the state of the feedstream is dynamic and thus it is difficult to predict when and how often backwashing will be required. This can lead to the system being set to cope with a "worst case" situation, causing the system to be run inefficiently.

Furthermore, choosing the size, number and type of modules 5 required when designing a filtration plant for a particular purpose involves the consideration of a number of factors. For example, plant capacity, level of filtration required, backwashing requirements and type of feedstream to be filtered each need to be investigated. Whilst some of these factors are relatively easy to measure, quantifying the characteristics of the feedstream in particular has proved difficult. Plant designers have tended in this respect to make assumptions about feedstream quality based on previous experience with similar types of feedstreams. To ensure that a particular filtration result is achieved, the plant may be designed using "worst case" assumptions for the feedstream. The designer must then balance these feedstream assumptions against size and cost constraints, as well as the other factors discussed above.

The problem of feedstream assessment is exacerbated when an unusual or unique feedstream is involved. In such cases, extensive and costly testing with scale models may be required to assess the effects of the particular feedstream on the desired type of filter unit. This adds significantly to the costs of designing and building filtration plants, particularly where many different filter units need to be tested.

It is an object of the present invention to overcome or at least substantially ameliorate one or more of these disadvantages of the prior art.

A further object of the invention, at least in one of its aspects, is to provide a control and monitoring system which can ascertain the state of the feedstream in real time and control the filtering system dynamically in response to the state of the feedstream.

DISCLOSURE OF INVENTION

According to a first aspect, the present invention provides a method of determining the fouling effect of a feedstream on a filter having known characteristics, said method comprising the steps of:

i) passing the feedstream through a filter having known characteristics;
ii) determining the change in resistance to flow of the feedstream across the filter, either continuously or over a number of time intervals; and
iii) from this data, calculating a feed fouling index (FFI) representative of the fouling characteristics of the feedstream with respect to the filter.

Preferably, the FFI is calculated by plotting the change in resistance across the filter as a function of volume filtered and measuring the gradient of a curve so plotted at a point or interval where the curve approaches a straight line.

In a preferred embodiment the change in resistance may be measured by taking readings of the cumulative volume of feedstream passing through the filter over time. Alternatively, pressure sensing devices may be positioned on either side of the filter to relate resistance changes in terms of trans-membrane pressure (TMP) drop.

In a second aspect the present invention provides an on-line method of monitoring and controlling a filtering system, said method comprising the steps of:

i) determining the resistance of filtering elements used in the filtering system by monitoring a number of operating parameters of the system;

ii) calculating an index representative of the fouling nature of the feedstream to the filtering system using the resistance value determined in i); and iii) controlling the operation of the filtering system in dependence on the value of the feed fouling index calculated.

It will be appreciated that the filtering system may be controlled in a variety of ways employing the feed fouling index as the controlling factor. For example, the backwashing cycle may be optimised for a particular quality of feedstream and varied dynamically in accordance with the quality of feedstream on a continuous basis. Similarly, the system may provide a self set up procedure on the basis of an initial feedstream quality which optimises the performance of the filtering system upon initial installation.

In particular, the invention has been found useful in measuring the fouling character of a backwash lagoon. The filtration process separates the incoming feed into a filtrate and backwash stream. The backwash stream is typically 10% of the incoming feedstream flow. In some applications it is important to try and recover as much liquid as possible from the backwash stream, for example, filtration systems in arid areas. In these cases the backwash is normally settled in a lagoon. The supernatant from the lagoon is then returned to the front of the filtration plant and shandied or mixed with the incoming feedstream. By turning on and off the supernatant flow, the fouling character of the lagoon can be monitored by noting the changes in the feed fouling index. If the fouling nature of the supernatant begins to rise unduly, as shown by rising feed fouling index, the system can be arranged to take action to correct this problem either automatically or through requesting operator intervention.

In a third aspect, the present invention provides an off-line method of determining the potential fouling effect of a feedstream, said method including the steps of:

i) passing a sample of the feedstream at a predetermined pressure through a filter having known characteristics;

ii) determining the change in resistance to flow of the feedstream across the filter, either continuously or over a number of time intervals; and iii) from this data, calculating a feed fouling index (FFI) representative of the fouling characteristics of the feedstream sample on the known filter.

Preferably, the method further includes the step of correlating the FFI with a second FFI calculated for a membrane filter for use in a filtration unit.

Desirably, the FFI is calculated by plotting the change in resistance across the filter as a function of volume filtered and measuring the gradient of a curve so plotted at a point or interval where the curve approaches a straight line.

It is desirable that the change in resistance of the filter is measured by recording at a number of predetermined points in time the cumulative volume of feedstream having passed through the filter.

In other embodiments, pressure sensing devices may be used to measure or estimate changes in resistance of the filter over time.

It is desirable that the FFI is calculated by a computer in response to entry of the resistance or pressure data. In a particularly preferred embodiment, the computer extrapolates from the entered data to provide a more accurate FFI.

In a fourth aspect, the present invention provides an apparatus for use in determining the potential fouling effect of a feedstream by the method of the third aspect above, said apparatus including:

a filter having known properties;

means to pass a sample of the feedstream through said filter at a predetermined pressure; and means for measuring the change in resistance to flow of the feedstream through the filter over time;

calculating quantitatively a feed fouling index (FFI) indicative of the fouling nature of the feedstream on the filter based on the measured change in resistance to flow so as to estimate the potential fouling effect of the feedstream on other known filters.

Preferably, the means to pass the feedstream sample through the filter includes a container for holding the sample, and means for pressurising the sample within the container for delivery of the sample to the filter at a preselected pressure.

Preferably, the pressurising means is a manually operated pump. Most preferably, the container and pressurising means are provided in the form of a modified manually operated garden-spraying apparatus.

Desirably, the filter element is of the cellulose acetate type. It is particularly desirable that 0.22 micrometer cellulose acetate filter paper is used.

In one embodiment, the regulating means takes the form of an adjustable valve incorporating a pressure gauge. It is desirable that a second pressure gauge is located in-line between the container and the regulator.

Preferably, one or more manually operable valves are provided to allow for priming and cleaning of the apparatus.

Another property of the filtering system which may be measured and used as a control parameter is the backwash efficiency. Backwash efficiency is a property of both the filtering system and of the feedstream and thus may be used to optimise the filtering system performance. Further, by using a perplexed experimental design it is possible to evaluate which of a number of designs is most appropriate to a given site or set of operating conditions.

As backwash efficiency also varies with the property of the feedstream and varies dramatically with pH changes when dosing the feedstream with chemicals such as alum, it has been found to be a useful control parameter to control dosing procedures. The usual method of control is to measure the pH directly and control using pH as the control parameter. However, pH sensors have been found difficult to keep in accurate calibration and control using the fouling character of the feedstream has been found to provide more reliable operation.

According to a fifth aspect of the present invention there is provided a method of monitoring and controlling a filtering system, said method comprising the steps of:

i) determining resistance values of filtering elements used in the filtering system at predetermined times during the backwash cycle of the system by monitoring a number of operating parameters of the system;

ii) calculating a backwash efficiency value representative of the efficiency of the backwash cycle of the filtering system using the resistance values determined in i); and iii) controlling the operation of the filtering system in dependence on the value of the backwash efficiency calculated.

Preferably, the predetermined times during the backwash cycle are just after a previous backwash, just before a next backwash and just after said next backwash.

According to a sixth aspect of the invention there is provided apparatus for monitoring and controlling a filtering system comprising:

i) means for determining resistance values of filtering elements used in the filtering system at predetermined times during the backwash cycle of the system by monitoring a number of operating parameters of the system;

ii) means for calculating a backwash efficiency value representative of the efficiency of the backwash cycle of the filtering system using the resistance values determined in i); and iii) means for controlling the operation of the filtering system in dependence on the value of the backwash efficiency calculated.

According to a seventh aspect of the invention there is provided a method of monitoring the operation of a filtration system comprising the following steps:
 a) sampling system parameter values at selected locations within the filtration system at a predetermined sampling rate;
 b) generating a parameter profile characteristic from the sampled parameter values at predetermined intervals of time; and
 c) analysing the parameter profile characteristic to determine correct operation of the filtration system.

Preferably, the analysing step includes comparing the generated profile characteristic against a desired characteristic and identifying regions within the generated characteristic which diverge from the desired characteristic.

According to a eighth aspect, the present invention provides apparatus for monitoring the operation of a filtration system comprising:
 a) means for sampling system parameter values at selected locations within the filtration system at a predetermined sampling rate;
 b) means for generating a parameter profile characteristic from the sampled parameter values at predetermined intervals of time; and
 c) means for analysing the parameter profile characteristic to determine correct operation of the filtration system.

The means for analysis may include means for comparing the generated profile characteristic against a desired characteristic and identifying regions within the generated characteristic which diverge from the desired characteristic. As a result of this comparison, the analysis means may indicate likely faults causing the divergence and also suggest possible solutions to the problem so that the fault may be corrected or circumvented and the system operation be returned to optimal operation. Such "troubleshooting" may be performed in an interactive way by providing an operator/user with an interactive display of the snapshot wherein the operator can indicate an area of the snapshot he is interested in and obtain details as to faults and solutions in regard to analysis of that region of the snapshot. Selection of the type of analysis required can be by way of drop down menu or the like.

BRIEF DESCRIPTION OF DRAWINGS

Preferred embodiments of the invention will now be described, by way of example only, with reference to the accompanying figures in which.

MODES FOR CARRYING OUT INVENTION

In one preferred form of the invention, the monitoring and control system comprises a dedicated computer processing system interfaced to a number of sensing and monitoring devices arranged to monitor selected operating parameters of the system. Under the control of system programs the processor responds to the entered parameters to control the operation of the filtering system. Apart from control of the system operation, the control and monitoring system may be programmed to perform regular testing of system performance, data logging and system telemetry.

As stated above, a good indication of the state of the feedstream has been found to be the feed fouling index (FFI). This index is a function of how fouling the feedstream is and will vary with the quality of the feedstream. The FFI for a particular system can be calculated as follows.

The resistance of a particular membrane is determined by:

$$R = \frac{\Delta P \times A}{\eta \times Q}$$

where

R=resistance to flow (m$^{-1}$), typically $10^{12}$;

$\eta$=viscosity of the feedstream (Pa, S), assumed to be water;

$\Delta P$=pressure across the membrane (Pa), often referred to as TMP;

Q=flow through membrane (m$^3$sec$^{-1}$); and

A=membrane area (m$^2$).

Figure 4:
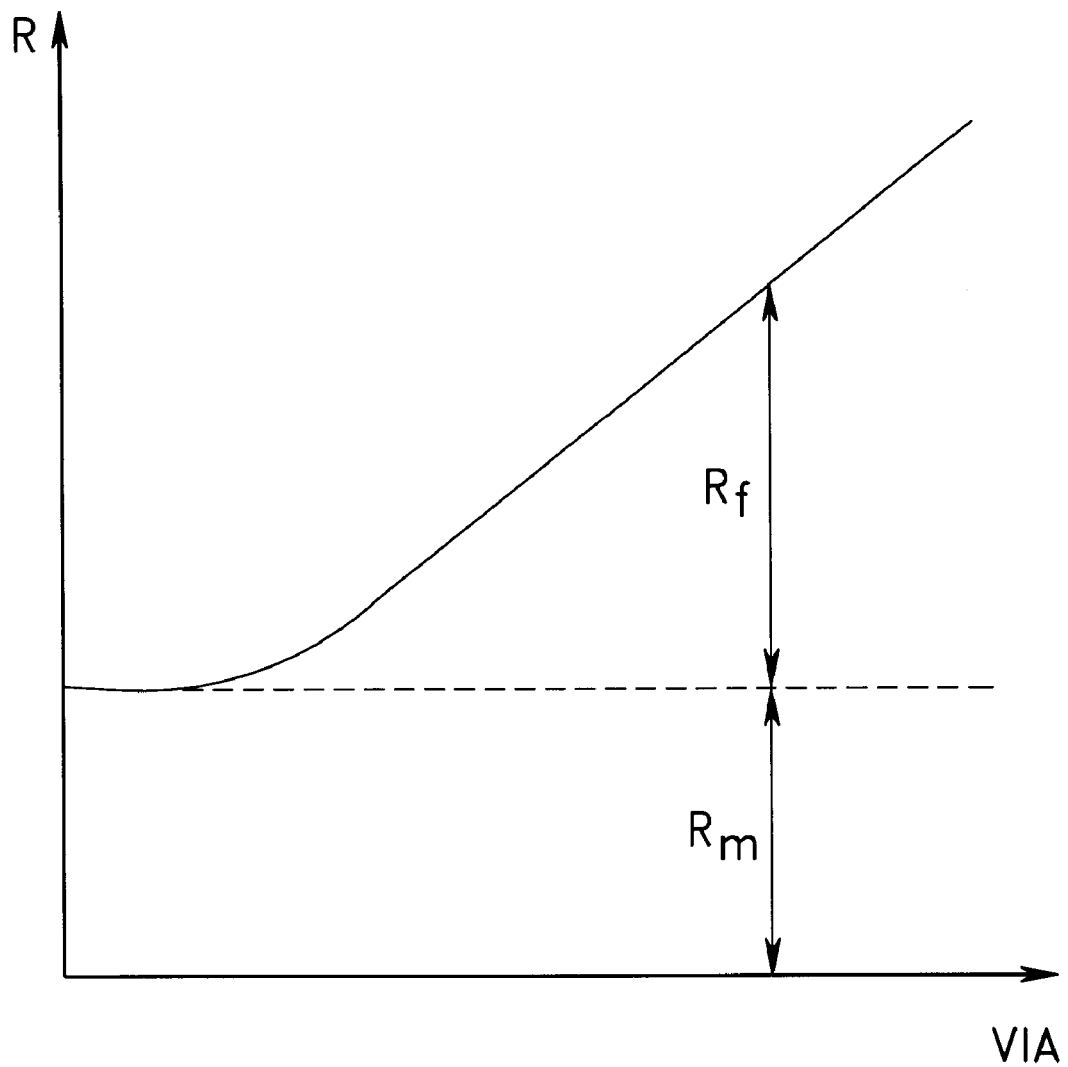
FIG. 4 shows a graph of the resistance characteristic of a membrane.

When liquid passes through the membrane it becomes fouled and the resistance rises. In many cases this rise is proportional to the quantity of liquid which has passed through the membrane. A graph of the resistance characteristic is shown in FIG. 4.

$$R = R_m + R_f$$
$$= R_m + FFI \times \frac{V}{A}$$

where:

$R_f$=resistance to flow due to fouling layer;

$R_m$=resistance to flow when V=0;

FFI=Feed Fouling Index, typically 0–500×10$^{12}$ m$^{-2}$; and

V=Volume of filtrate passed through the membrane.

The performance of a given fibre compared to a standard fibre is given by the MMP, where MMP for the standard fibre is defined to be 1. So for a membrane X, $$MMP_x = \frac{FFI_x}{FFI_{MSF}}$$

where:
$MMP_x$=membrane porosity for fibre x;
$FFI_x$=feedstream fouling index for fibre x; and
$FFI_{MSF}$=feed fouling index for standard fibre on the same feedstream as used for $FFI_x$.

The feed fouling index (FFI) can be used to measure the efficiency of the upstream process from the continuous microfiltration plants. For instance, if a bioreactor is used to produce secondary sewage, or treated paper waste, or if a clarifier is used to treat potable water, the FFI will give an estimate of the suspended solids level and the nature of the solids (particle size, compressibility etc). By varying the operating parameters of this upstream process and monitoring the FFI it can be optimised for the continuous microfiltration process, allowing more economical performance.

The compressibility of a dirt layer is a measure of the increase in resistance of a given dirt layer as the TMP increases. This can be seen as an apparent increase in FFI. Some feedstreams are relatively incompressible, or may become appreciably compressible over a threshold TMP value. River waters fall into this class. However, as the "organic" solids level increases the compressibility increases. Sewage is compressible according to its quality. If the suspended solids level is high, and particularly if algae are present, the compressibility is high. Paper waste is extremely compressible.

It has been found that good quality secondary sewage (suspended solids and soluble BOD less than approximately 5) has considerably less compressibility than ordinary or poor quality secondary sewage. The FFI is also lower, allowing both higher fluxes and higher TMP's to be used. The latter extends the time between chemical cleans, reducing the operating costs of the system.

The recirculation pressure drop is a measure of the blocking of modules. It has been found that in floccing of sewage to remove phosphate, the TMP may recover with each backwash. The maximum TMP reached might remain low, but the recirculation pressure builds up rapidly. This has been correlated with a build up in solids in the module. These factors may be used to trigger the chemical clean, rather than the maximum TMP as usually happens.

Figure 6:
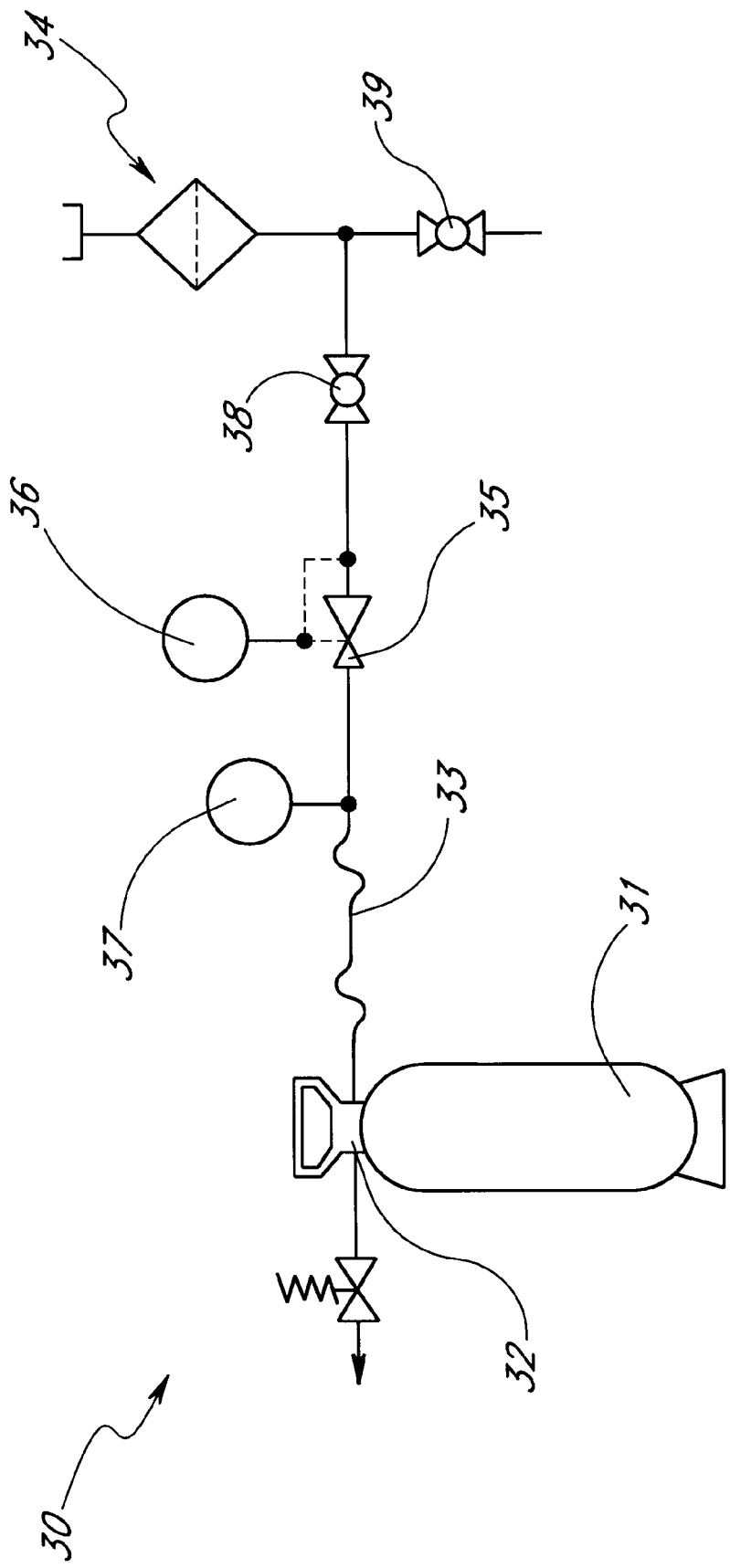
FIG. 6 is a schematic diagram of an apparatus according to the fourth aspect of the invention.

In a second preferred embodiment, shown in FIG. 6, the invention consists of an apparatus 30 for use in determining the potential fouling effect of a feedstream using a method described above.

The apparatus 30 includes a sample container 31 and a manually operable pressurising pump 32. A pressure hose 33 extends from the interior of the container 31 to a filter housing 34, and includes in-line a first manually operable valve 35 incorporating a first pressure gauge 36. A second pressure gauge 37 is also provided in-line with the hose 33 intermediate the container 31 and the filter housing 34. In an alternative embodiment, the pressure hose 33 is omitted, and valve 35 directly connects the interior of the container 31 with the filter housing 34.

The filter housing 34 is adapted to hold a disposable filter element (not shown) having known characteristics. In a preferred embodiment, 0.2 μm cellulose acetate filter paper is used.

In use, a feedstream sample is placed in the container 31. The apparatus is primed and a clean filter element is installed into the filter housing 34. The manual pump is then operated to pressurise the container to about 120 kPa.

The first valve 35 is opened until the feedstream fluid is being supplied to the filter at a steady 50 kPa. The filtrate flowing from the outlet side of the filter housing 34 is captured in a measuring beaker (not shown). At the end of each minute, the cumulative volume of filtrate is recorded, until about 16 samples have been taken.

The flow may then be stopped and the apparatus flushed and cleaned in preparation for further testing.

The recorded time and cumulative volume data are entered into a proprietary software program which calculates the FFI of the feedstream according to the mathematical relationships discussed above. The FFI may be calculated more precisely by including software routines which extrapolate the time/volume curve. Other data manipulation techniques such as averaging or interpolation may be similarly employed.

Other valves 38 and 39 may be provided for the purposes of priming and cleaning the apparatus. There may also be provided valves, gauges or pressure or flow sensors for otherwise controlling or measuring the pressure and flow characteristics of the feedstream sample.

It should be noted that the FFI is a characteristic of the feedstream and the filter. By calibrating the properties of other types of filters with a range of FFIs, the potential fouling effect of a particular feedstream on a range of filter types may be quantitatively estimated with a single feedstream sample. Filtration systems may be designed and scaled to a particular performance level without the need for extensive and costly testing procedures.

The FFI may also be used to optimise, monitor and troubleshoot the operation of existing filtration systems. In its on-line form, the invention may perform continuous or regular checks of feedstream quality. This allows backwashing and maintenance cycles to be run with maximum efficiency.

The off-line form of the invention may be used to troubleshoot existing systems which do not include on-line testing. Alternatively, the off-line system, and particularly the apparatus described, may be used as an invaluable tool in assessing feedstream quality before the filtration system is designed. Quantitative assessment of feedstream quality allows system designers to more accurately predict the likely behaviour of a variety of filtration elements in response to a given feedstream. This is of particular importance where the feedstream to be filtered is of a unique or rare type.

Figure 5:
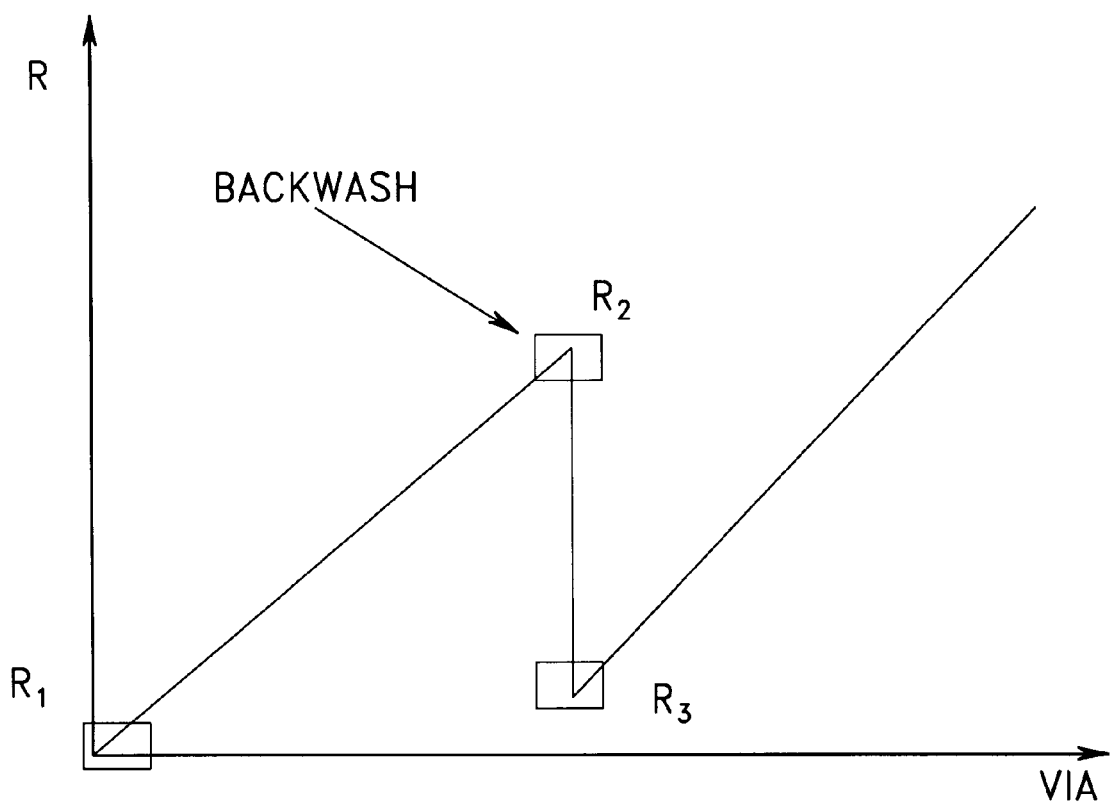
FIG. 5 shows a graph of resistance versus volume of filtrate following backwashing.

As stated earlier, backwash efficiency is also a useful control parameter. As shown in FIG. 5, after each backwash, the resistance of the membrane drops but does not return to the original value. The backwash efficiency is a measure of how closely the resistance value returns to its original value.

The backwash efficiency (BE) is defined as follows:

$$BE = 1 - \frac{R_3 - R_1}{R_2 - R_1} \times 100$$

where $R_i$=resistance at time i (i=1 denotes just after the previous backwash, i=2 just before the backwash in question and i=3 just after the backwash in question).

The backwash efficiency can be used to optimise the efficiency of the backwash. For instance, it has been shown that increasing the capacity of the air lines to the machines (and hence the air supply) increases the maximum negative TMP of the backwash. This in turn increases the backwash efficiency. Additionally, the inclusion of an air on pump on (AOPO) stage has also been shown to increase the backwash efficiency. "Air-on pump-on" refers to a process where feed liquid is reintroduced into the shell of a continuous microfiltration unit while a gas backwash is still proceeding. A duration of 10 seconds AOPO was shown to make no further improvement in backwash efficiency compared to 5 seconds AOPO. Additionally, an 8,000 liter/hour/module crossflow during backwash sweep was shown to give the same backwash efficiency as 4,000 liter/hour/module. All stages of the backwash ie. initial duration of air on (pre AOPO), length of AOPO, velocity and duration of sweep stage, etc. can be optimised. This may well vary for machine type, feed type, a particular feed with time, or an identical feed if high flux becomes more important than operating cost.

Additionally, the backwash efficiency measurements can be used to optimise treatment of feed. It is well known that chlorine reduces the fouling of reverse osmosis (RO) membranes, and it is also used in ultrafilters as a liquid backwash. Not surprisingly, it is believed to improve the backwash efficiency for continuous microfiltration, both on sewage with polypropylene membranes and town water with PVDF membranes. Other chemicals can also be used to improve the backwash efficiency. The concentrations of these chemicals and the way in which they are applied (ie. time before the feed hits the membrane and possibly applying a higher pulse of chemical just after a backwash or only applying the chemical after a backwash) may be further optimised. It is possible that allowing the machine to run to its maximum TMP before backwashing may be found to be more efficient. (This compares with the current methods of backwashing after a fixed time in filtration, or after a predefined TMP or resistance increase.)

Additionally, the use of precoats to prevent the sticking of solids to the membranes may be optimised using backwash efficiency measurements. These have the effect of collecting impurities on the coating, the coating and impurities being blown off the membrane during the backwash process. These precoats could be used to make backwashable ultrafilters, nanofilters or RO filters possible.

An example of using backwash efficiency to optimise a process was the floccing of drinking water to remove true (dissolved) colour. It was found that the efficiency of the alum floc increased as the pH decreased. However, as the pH dropped below 6.0 the backwash efficiency decreased from about 98% to 70%. This was found to reverse on raising the pH above 6.0 again.

A number of testing procedures can also be employed by the control and monitoring system to ascertain whether the filtration system is operating correctly and to check for failures or deterioration in system performance.

A wastewater filtering system may comprise several hundred modules, each module containing many thousands of fibres. Although failure in these systems is rare, the failure or breakage of a single fibre may compromise the integrity of the entire system by allowing unfiltered influent to enter the interior of the failed fibre and thereby contaminate the filtrate.

A known test for identifying a module containing a failed fibre is the Diffusive Air Flow Test (DAF). Diffusive air flow is the flow of air from high to low pressure zones via solubilisation of the air in water within the membrane. In this test the space intermediate the fibres and shell of a selected module or modules is filled with air or water and the interior of the fibres is supplied with pressurised air. The fibre membrane is previously wetted to fill the pores with liquid and the rate at which air diffuses from the interior of the fibre to the exterior of the fibre is measured. In the absence of any failed fibres the rate will correlate with a reference value which is indicative of the expected diffusive flow from the fibre interior to the fibre exterior at a given pressure difference for the particular membrane.

It is important to note that if a certain pressure is exceeded diffusive flow will be upset by the creation of bubbles of air at the pores. This is known as the bubble point of the membrane and is defined by the following equation:

$$P = \frac{4 \cdot \cos(\theta) \cdot B \cdot \gamma}{d}$$

where:
P=bubble point pressure;
θ=wetting angle;
B=Bechold capillary constant;
γ=surface tension of wetting liquid; and
d=pore diameter.

Clearly if a failed fibre is present the measured rate will be higher as it will include a component due to flow of air through the fault as opposed to diffusive flow through the pores. Another test useful in monitoring the integrity of the fibre lumens is the pressure decay test. This test is generally available in some form as an automated process on standard machines. As with the DAF test, the lumens are first pressurised with air to the test pressure (usually 100 kPa) keeping the shell-side of the membrane full. Once the test pressure has been reached the filtrate side is sealed and the shell-side vented to atmosphere. The drop in pressure of the filtrate system with time is then monitored. This pressure decay will be directly related to air flow across the membrane and hence system integrity, assuming no leaking valves.

This test is particularly useful for systems that require integrity levels of less than log 4.5 to 5.0 as it is a simple and convenient test to carry out on-site. However, integrity levels greater than log 5 require pressure decay rates of below 1 kPa/min (0.14 psi/min), which are difficult to measure accurately. In such cases the DAF test would be used.

These tests can be carried out automatically by the control system at regular intervals and/or in response to a detected deterioration in performance parameters.

Filtration systems use a large number of valves to control their operation and the correct operation of these valves is critical to optimal system performance. The control system, according to one form of the present invention, provides a number of options for control and monitoring of valves.

It has been found difficult to detect whether a single valve has failed on the filtration machine or is leaking. Major failures will stop the machine working and are simply detected by a filtrate failure alarm. The use of an intelligent monitoring and control system enables extensive monitoring of valve performance. The control system measures a pressure profile of the machine at a predetermined reference time and compares the current value at regular intervals or continuously with the reference profile. If there is no significant difference, this is taken as indicating the machine is working normally and all valves are operating correctly. Any significant difference will indicate a valve fault and will be reported by the monitoring system.

The following embodiment illustrates one form of the invention as it relates to the pressure profile for the backwash cycle of a membrane filtration system, however, as noted earlier, the invention according to this aspect is equally applicable to the operating parameters of any filtration system, for example, polymer melt filtration, gas filtration and reverse osmosis systems where regular cleaning of the filter membranes is required.

A backwash profile is a record of pressures and flows generated during the backwash cycle. It provides a considerable amount of information on what is happening during the backwash and is used in this embodiment of the invention to diagnose problems with backwash performance in a continuous membrane filtration unit.

Due to the nature of the backwash, pressures and flows change rapidly and must therefore be recorded using specialised data logging equipment and/or software capable of measuring and recording the changes. The most commonly used means is by a laptop computer fitted with the necessary analogue to digital converters and isolators for analogue instrumentation inputs or direct digital inputs, together with the appropriate software for collection, storage, display and analysis of the data obtained. In a typical backwash profile, data will be collected on feed and filtrate pressures and on feed (or filtrate) flows. Such equipment typically samples data at the rate of 10 to 20 points per second, compared with, say, once every 2 minutes for long term data collection.

In order to interpret the backwash profile an understanding of the various stages of the backwash and their purpose is required.

Figure 7:
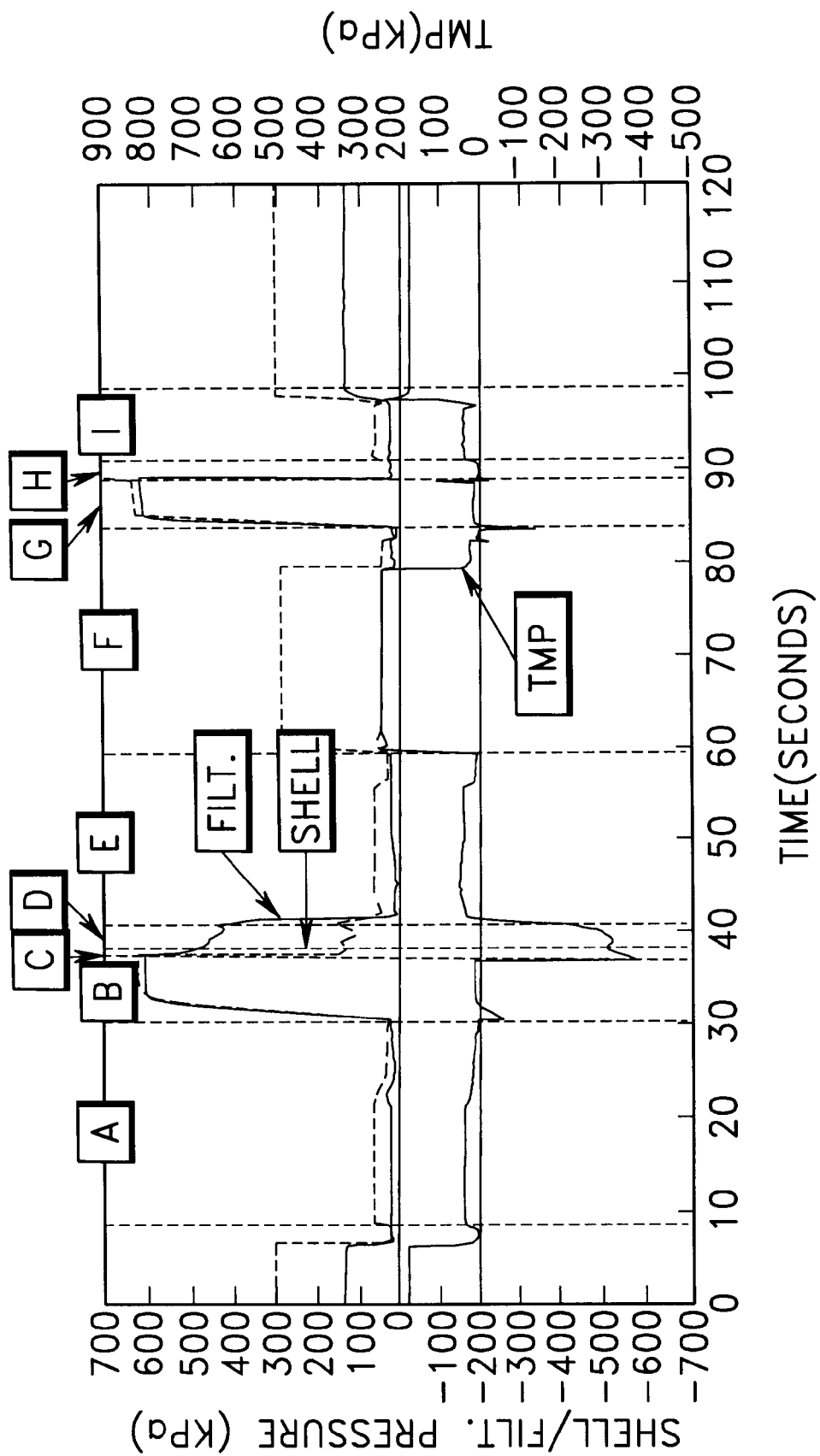
FIG. 7 shows a typical backwash profile for a continuous membrane filtration machine.

A typical profile for a continuous microfiltration unit is shown in FIG. 7. The data presented was collected using data logging equipment at a sampling rate of 20 samples per second. The transmembrane pressure (TMP) has been calculated from the difference between the feed and filtrate pressures, and is also shown in FIG. 7.

The pressure profile shown in FIG. 7 contains a number of characteristics associated with the various backwash steps, that influence the efficiency of the backwash. The following describes the backwash stages with reference to FIG. 7.

Referring to FIG. 7, the initial backwash step is the drain lumen step (A). The function of this step is to drain liquid from the lumens prior to pressurising with air. The lumen drain requires sufficient air pressure to push the liquid out of the lumen in a reasonable time period without exceeding the membrane bubble point. If the lumen drain pressure is too high, breakthrough of air into the shell side may occur. This may lead to a reduced negative transmembrane pressure (TMP) in the blowback step (C) and/or uneven backwashing. If the lumens are not fully drained then backwashing will be uneven. Consequently, the lumens must be fully drained to achieve the most efficient backwash.

Figure 1:
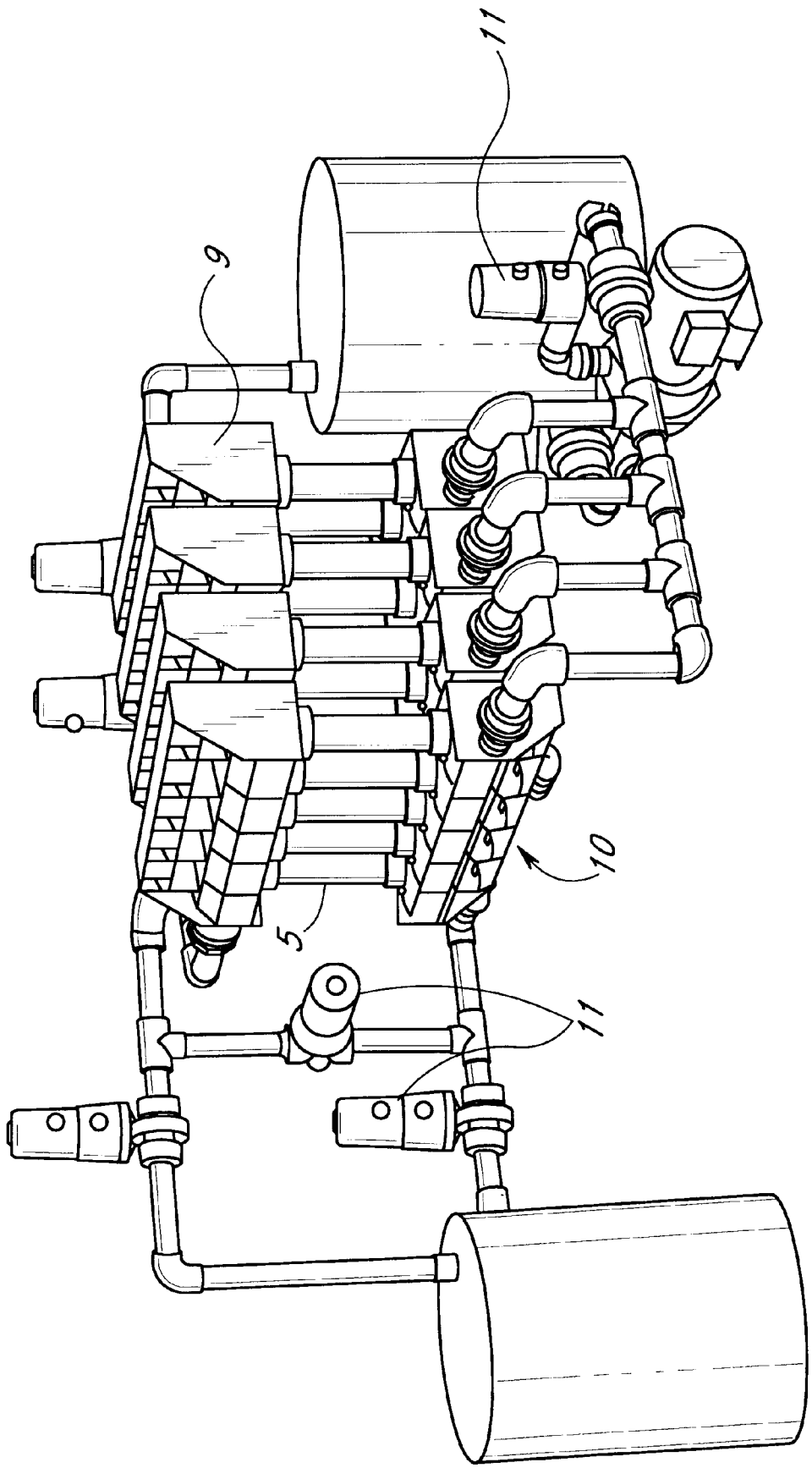
FIG. 1 shows a typical cross-flow microfiltration system.
Figure 2:
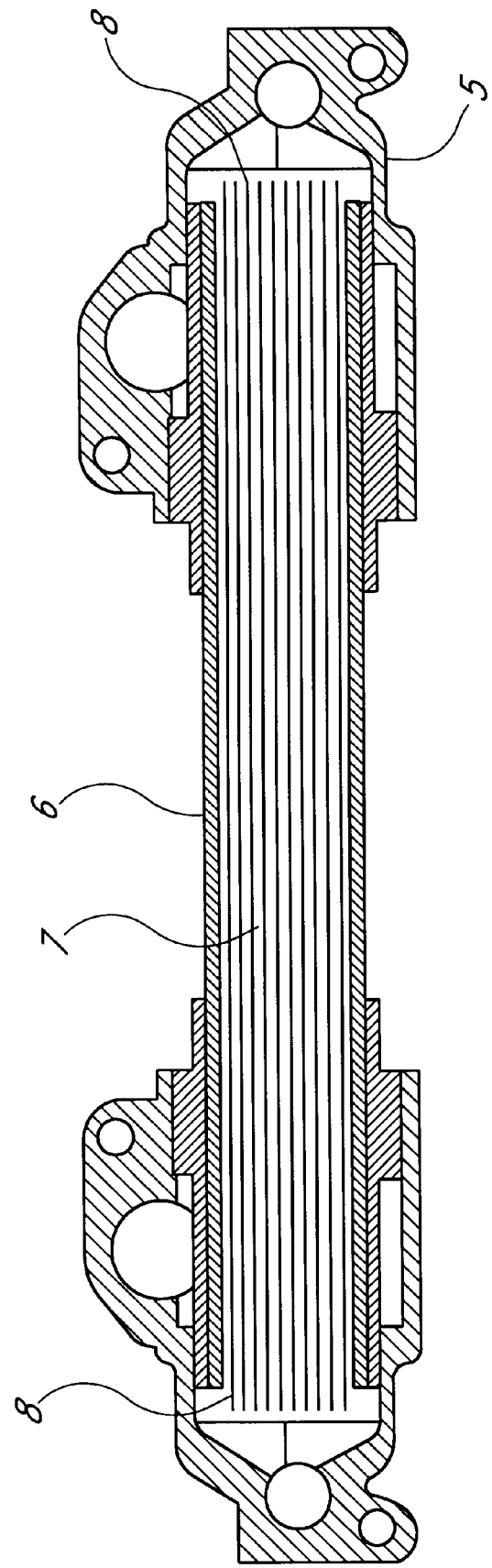
FIG. 2 shows a detailed cross-sectional view of a fibre module used in FIG. 1.
Figure 3:
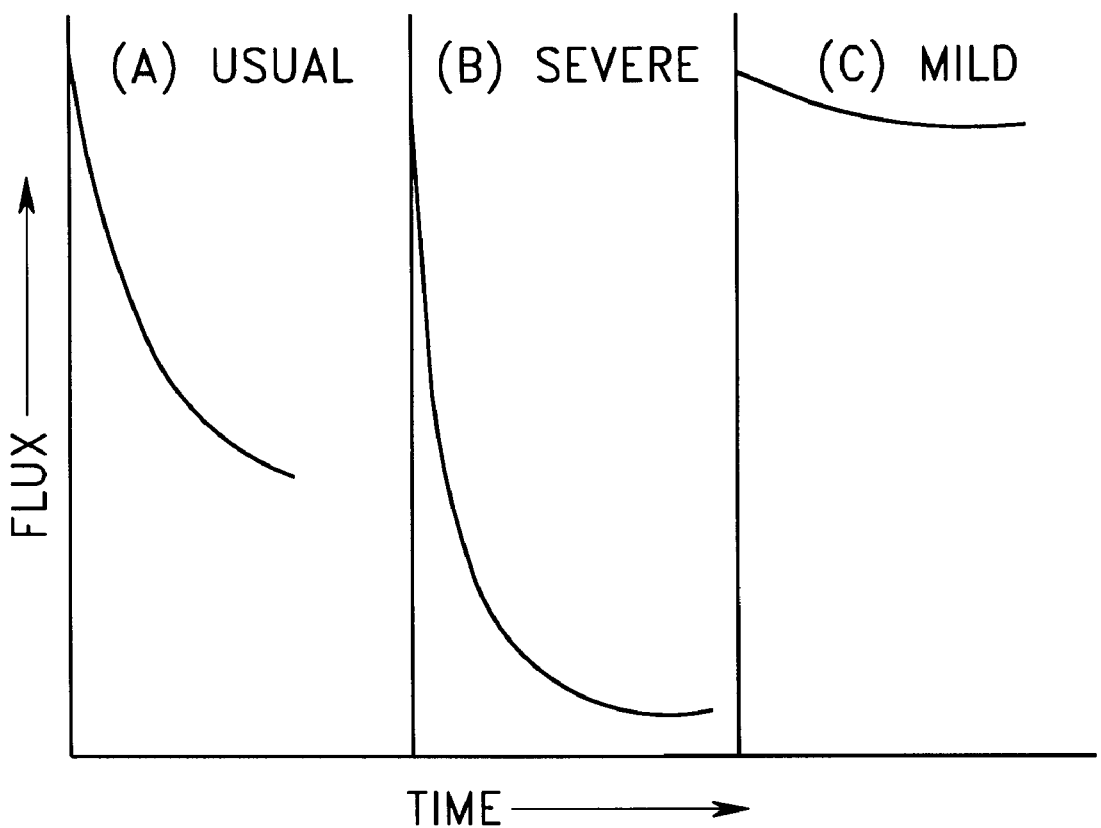
FIG. 3 shows different types of flux decline over time.

The next step is the pressurise step (B). During this step both the shell and filtrate sides should ideally pressurise to about 600 kPa (87 psi). This will result in the maximum negative TMP during the blowback step. In FIG. 1 both the shell and filtrate have pressurised uniformly to around 600 kPa and there is minimal negative TMP during this stage.

The pressurise step is followed by the blowback step (C). The negative TMP generated in this step by the rapid opening of the shell side valves, is critical to the efficient backwashing of the membrane. The negative TMP generated can depend on the speed at which the backwash valves open, the presence of air on the shell side (Step B above), and the resistance in the backwash lines that the accelerating liquid must overcome.

The air on-pump on step (D) has been found to be particularly beneficial in most feed streams. Sufficient time should be allowed in the program for this step (minimum 5 seconds). The addition of feed flowrate to the profile aids at this point in ensuring adequate feed flow.

During the shell sweep step sufficient flow is required to ensure the complete flushing of solids from the modules and the removal of air from the shell side prior to filtration and rewetting.

Assuming the time for this step has been set based on a predetermined design sweep flow, then if the flow in this step is below the design flow, inadequate solids removal will occur leading to module blockage and poor backwash recovery. If the flow is higher than the design flow then the result will be excessive backwash production, reducing overall efficiency.

Step (F) is required to refill the lumens and purge remaining air from the filtrate system prior to rewetting.

If the lumen fill is incomplete this will result in air entering the lumen during the pressurise step of the rewet leading to a pseudo-backwash and consequent poor rewet. An excessively long exhaust step does not affect the backwash but will increase downtime and backwash waste volume, hence overall efficiency and filtrate production will be lowered.

The next stage in the backwash process is the rewet cycle. This cycle is required to return the lumens to a suitable state for recommencement of the filtration cycle. This cycle commences with a pressurise step (G) and, as with the backwash pressurise step (B), both the filtrate and shell side pressures should reach at least 500 kPa but preferably 600 kPa (87 psi). Pressures lower than this may lead to incomplete rewetting.

The next stage in the rewet cycle is the rewet exhaust step (H). It is important at this stage that the shell and filtrate pressures drop at roughly the same rate. If the shell and filtrate pressures drop at different times, the result will be either a negative or positive TMP spike and these should be avoided.

During the rewet exhaust step some air is released from the fibre walls into the shell side. The purpose of the shell exhaust step (I) is to purge this air from the shell prior to returning to filtration (or a second rewet).

Further details of backwash operation are detailed in our associated patent applications, PCT/AU95/00587, AU-A-55847/86, AU-B-34400/84 and AU-A-77066/87, which are incorporated herein by reference.

The backwash profile measures pressures and flows directly (along with other data as required). As a result it is capable of picking up faults which are not always apparent using a visual check of valves, actuators, solenoids etc.

The following examples are designed to give an indication of the types of problems that can be identified using the profile analysis.

EXAMPLE 1

4M10C CMF Unit—Rewet Program Fault

Figure 8:
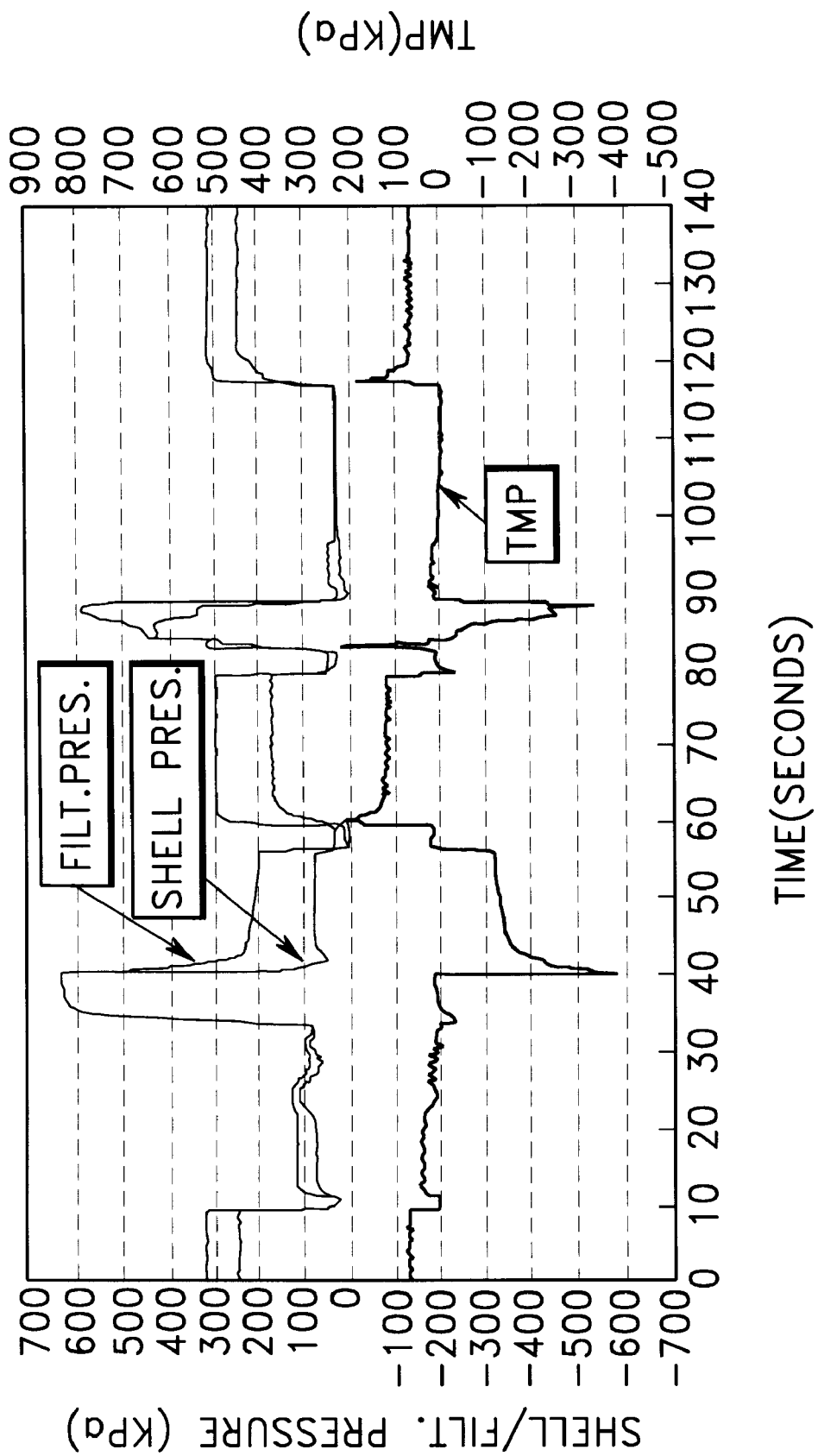
FIG. 8 shows a snapshot profile obtained from a filtration machine installed on a domestic water supply for pretreatment to Reverse Osmosis with a rewet program fault.

FIG. 8. shows the snapshot profile obtained from a 4M10C machine installed on a domestic water supply for pre-treatment to Reverse Osmosis. The snapshot was performed using logging equipment at a sample rate of 20 Hz. The machine had been performing poorly and required frequent cleaning.

The only abnormal feature to note on the backwash portion of the cycle (0 to 65 s) is that the filtrate pressure remains high during the shell sweep. This was re-programmed to vent 5 seconds after the start of the shell sweep stage.

Figure 9:
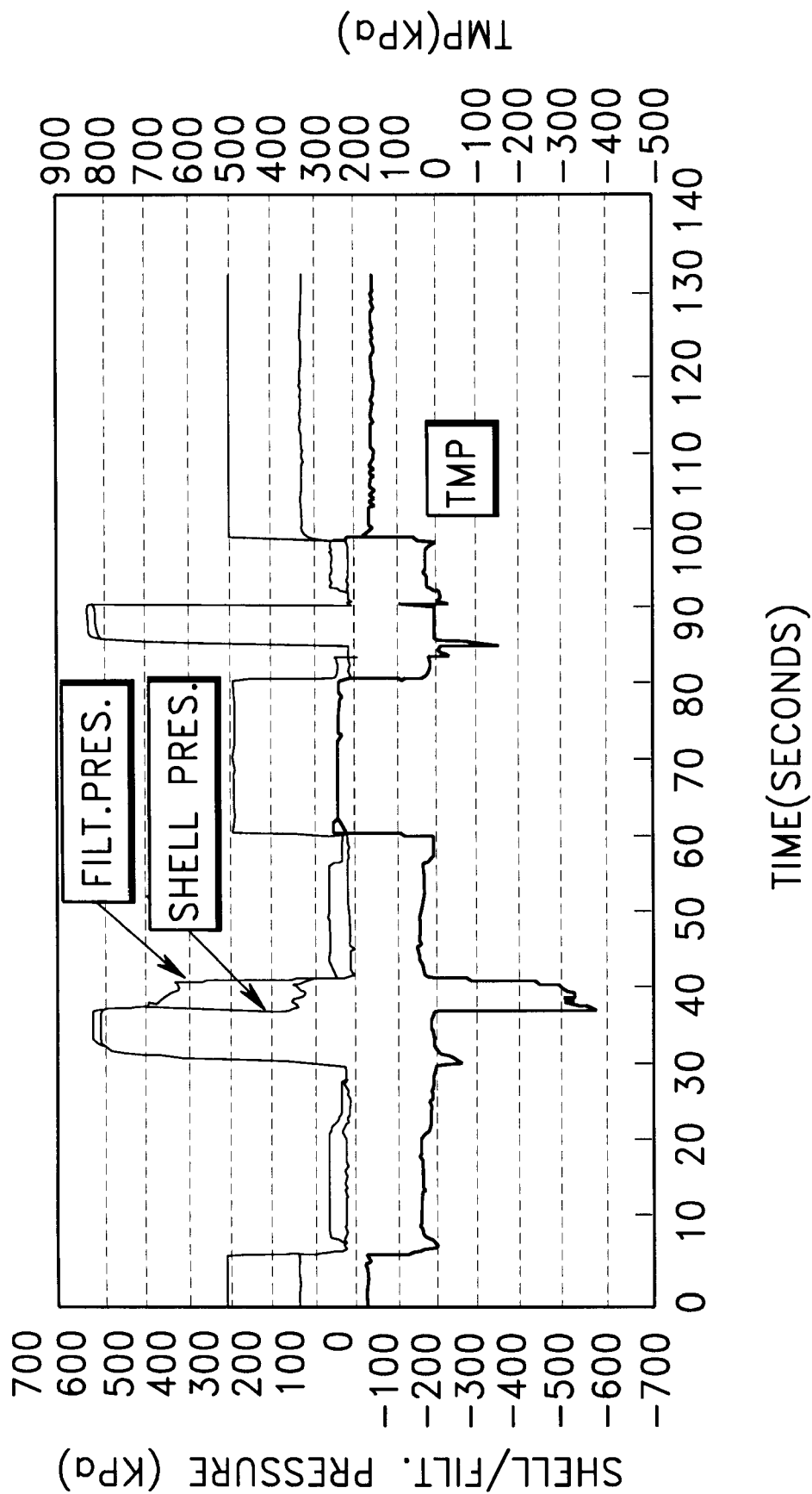
FIG. 9 shows a snapshot profile of the same machine as FIG. 8 with the fault corrected.

Unlike the backwash stage the rewet profile is clearly abnormal. A problem is apparent with the rewet pressurise step as the filtrate and shell sides do not pressurise uniformly nor do they reach 600 kPa. This indicates that air is escaping from the system and preventing adequate pressurisation. Closer inspection of the plant showed that the feed valve was failing to close during the rewet pressurise stage. This was due to a programming fault which was easily rectified. The resulting profile is shown in FIG. 9. The new profile shows the effect of venting the filtrate pressure during the shell sweep and also the marked improvement in the rewet profile.

EXAMPLE 2
90M10C CMF Unit—Faulty Filtrate Valve Positioner

Figure 10:
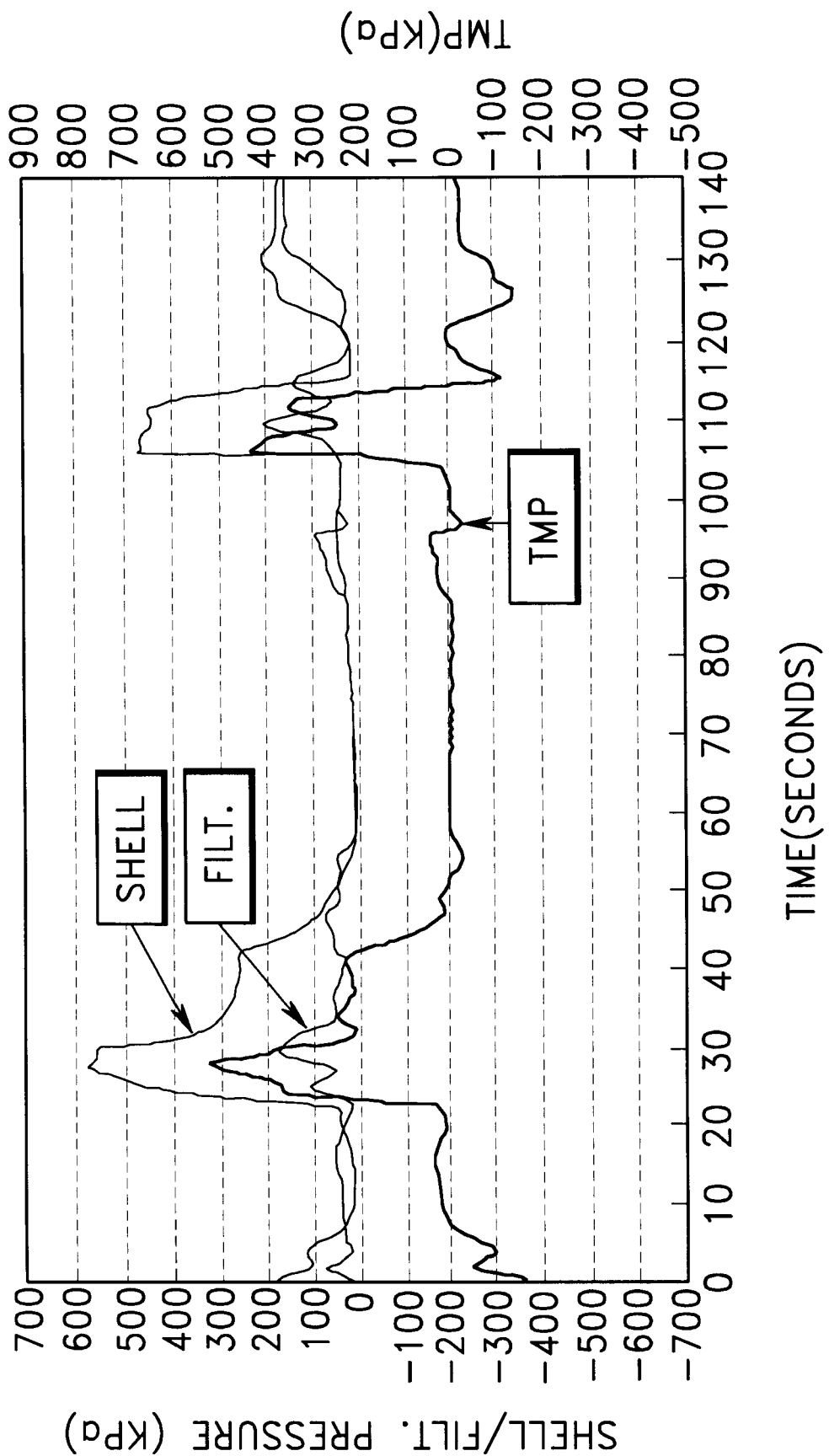
FIG. 10 shows a snapshot profile obtained from a filtration machine with a faulty filtrate valve positioner.

The profile obtained from a 90M10C machine is shown in FIG. 10. Pressurisation is very poor during both the backwash and rewet pressurisation steps. The TMP during the blowback is actually positive rather than negative hence there was no real backwash at all. The fault in this case was a filtrate control valve. The valve positioner was not allowing the filtrate control valve to close fully at any stage. Consequently the unit could not pressurise as air was continually being lost through the filtrate line.

Figure 11:
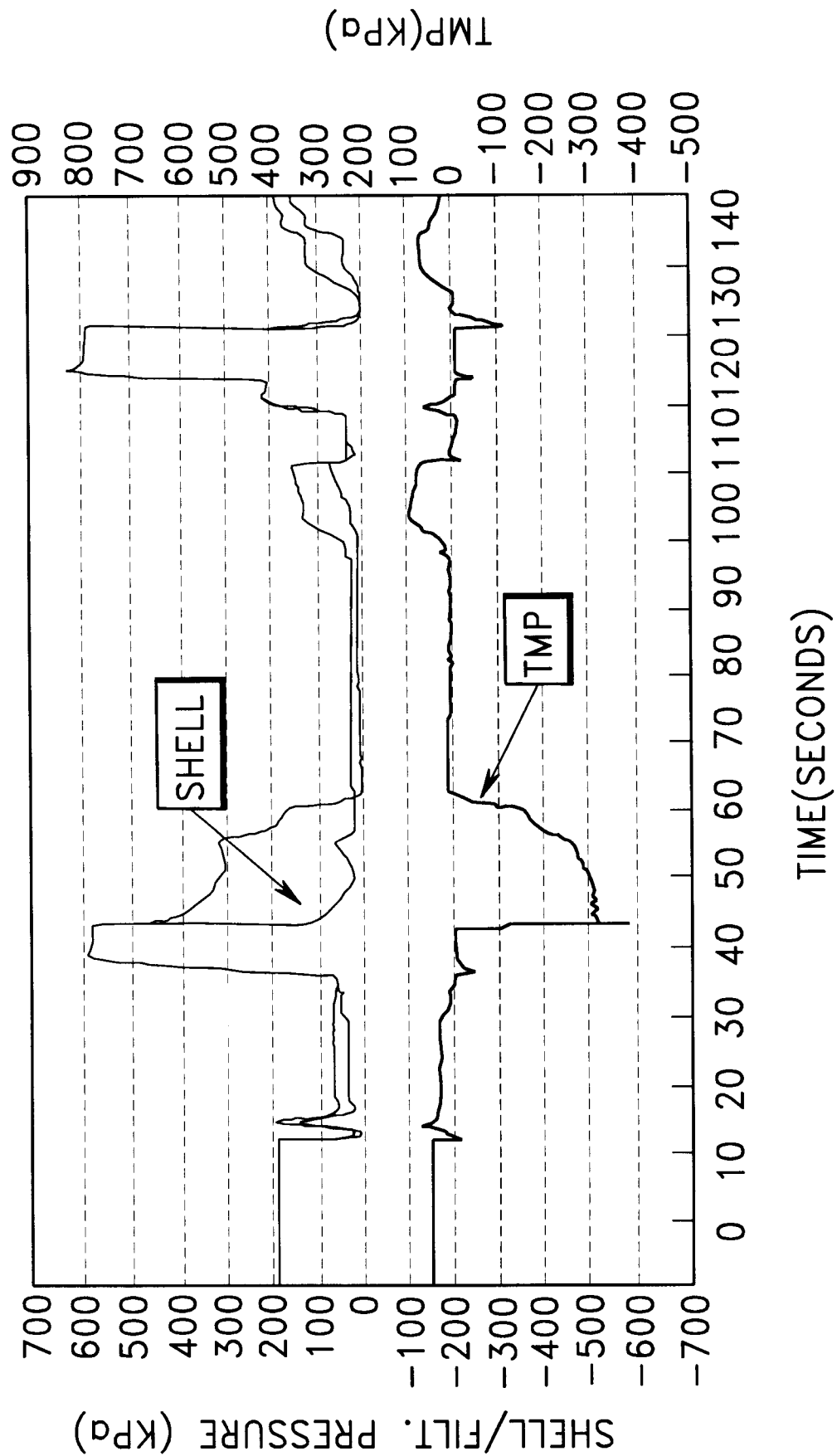
FIG. 11 shows a snapshot profile of the same machine as FIG. 10 with the fault corrected.

After readjusting the filtrate control valve positioner, the profile was re-recorded with the result shown in FIG. 11. The negative TMP is now about 380 kPa which gives a good backwash.

The profile, however, still shows a minor problem during the rewet exhaust, during which the duration of the negative TMP spike is longer than desirable (about 2.5 seconds c.f. a recommended maximum of 1 second). This was found to be due to a program fault that resulted in one of the shell side valves still being partially open during the initial part of the pressurise step. This allows filtrate to be pushed from the lumens to the shell thus introducing excessive air into the filtrate system. The result is that the filtrate exhaust does not occur as rapidly as it otherwise would due to the additional expanding air.

EXAMPLE 3
300M10—Excessive Rewet Pressure Spikes

Figure 12:
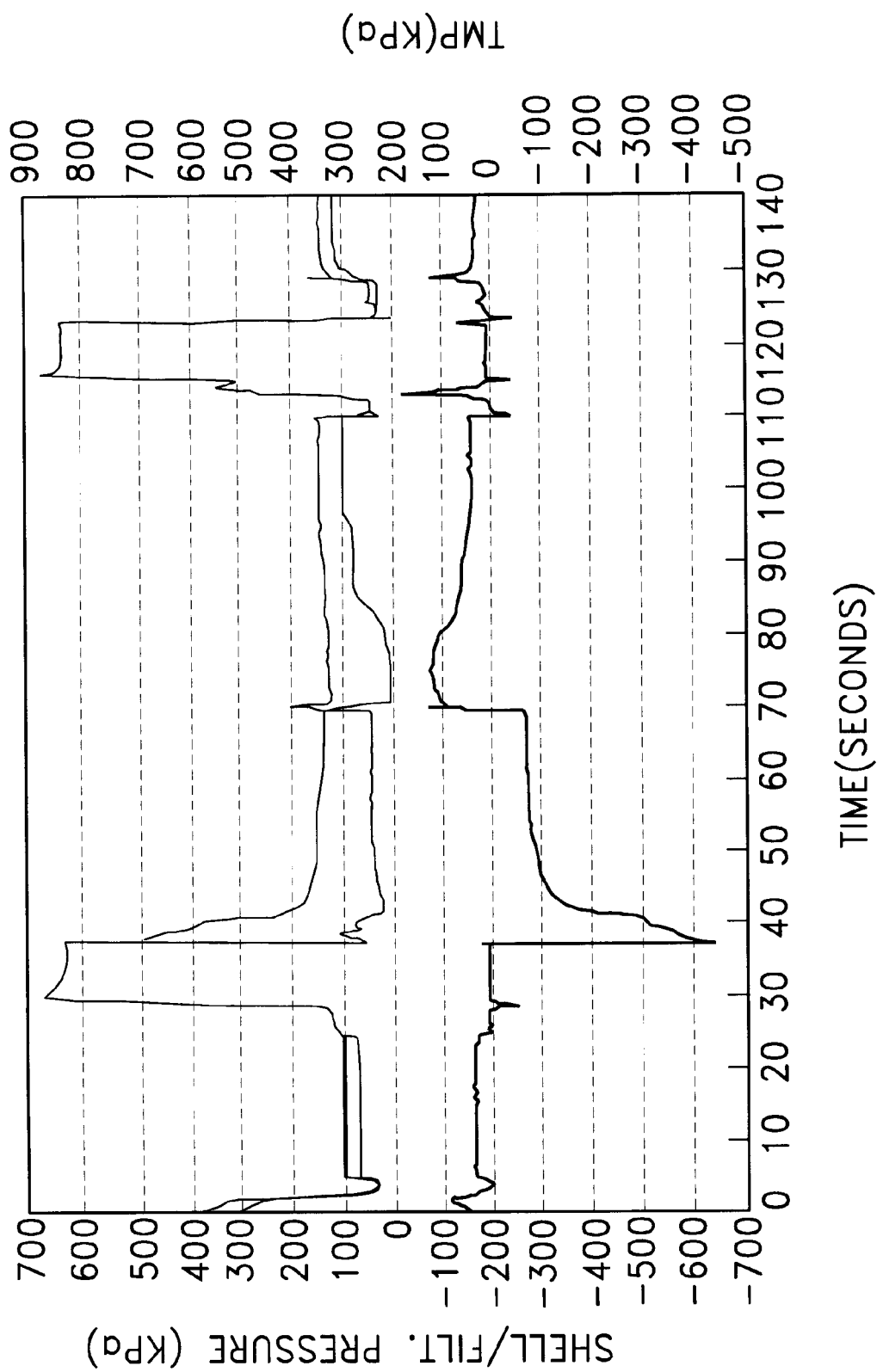
FIG. 12 shows a snapshot profile obtained from a filtration machine with excessive rewet pressure spikes.

This machine was installed as part of a drinking water plant filtering surface water. The machine is fitted with a chart recorder to monitor plant flows and TMP. The chart recorder was indicating pressure spikes during the backwash/rewet cycle of up to 180 kPa. There was concern that these spikes may lead to reduced backwash efficiency and increased fouling. A snapshot was carried out using data logging equipment, sampling at a rate of 20 Hz. The resulting profile is shown in FIG. 12.

The blowback stage of the cycle shows a good negative TMP (−446 kPa) and looks normal. The rewet cycle is the source of the pressure spikes with positive spikes of 177 kPa during the pressurise and 117 kPa during the exhaust.

Figure 13:
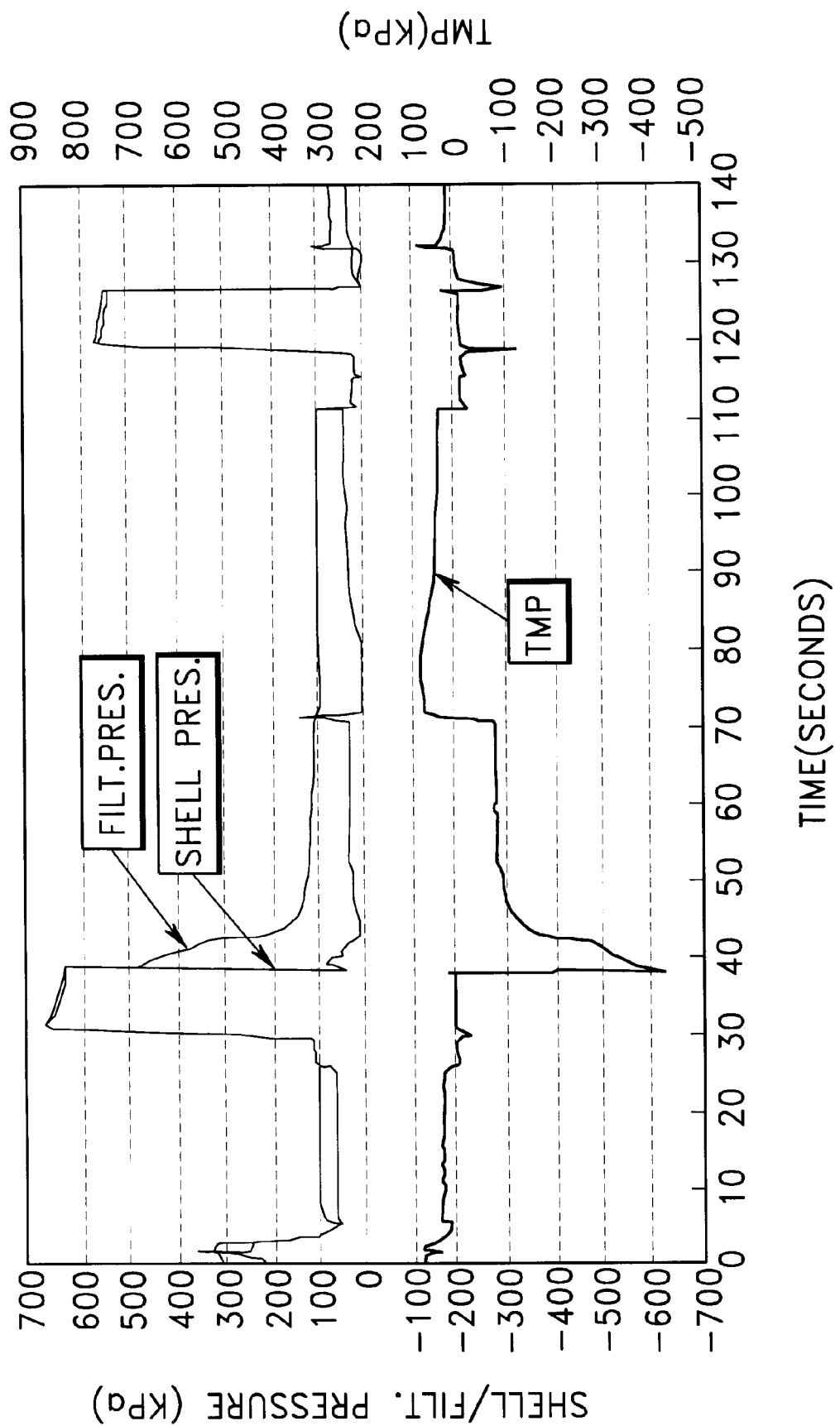
FIG. 13 shows a snapshot of the same machine as FIG. 12 with the fault corrected.

Examination of the sequence table in conjunction with the pressure profile showed that the spike corresponded with the closing of the feed and backwash valves. In this case the backwash valve was closing faster than the feed valve causing the shell side to pressurise. This was rectified by introducing a 2 second delay after closing the feed valve and before closing the backwash valve. It can be seen from FIG. 13 that the pressure spike in question has essentially been eliminated. Further tuning could be done to minimise some of the other spikes although this is unnecessary as they are relatively small and unlikely to be a problem.

Another feature which may be provided by the control and monitoring system according to the invention is actual control of the operation of the valves used throughout the filtration system. Setting up a filtration machine requires careful timing of valve operations and some of these timings are site specific.

It has been found that by pulse width modulating the operation of the valves they can be accurately opened and closed at any desired rate. The control system can adjust the rate of opening and closing of valves to avoid water hammer.

The control and monitoring system may also monitor pressure spikes and control the valves accordingly. Such monitoring may also provide closed loop control which compensates for performance degradation of the valves as they age over time.

Position control of the valves is also possible by using open loop control and controlling the loop using measurements of flow and pressure drop within the system.

It will be appreciated that the forms of the invention described are not limited to the specific embodiments described above and further exemplifications of the invention are possible without departing from the scope of the invention.

What is claimed is:

1. A method of determining the fouling effect of a feedstream on a filter having known characteristics, said method comprising the steps of:
   i) passing the feedstream through a filter having known characteristics;
   ii) determining the change in resistance to flow of the feedstream across the filter, either continuously or over a number of time intervals; and
   iii) using the information determined from step ii), calculating a feed fouling index (FFI) representative of fouling characteristics of the feedstream with respect to the filter, where $$FFI = \frac{\Delta R}{\Delta(V/A)},$$

with FFI=Feed Fouling Index, $\Delta R$=change in resistance, V=volume of feedstream filtered and, $\Delta(V/A)$=change in the ratio of volume of feedstream filtered to filter area.

2. A method according to claim 1, wherein the change in resistance across the filter is plotted as a function of volume filtered and the FFI is calculated as the gradient of a curve so plotted at a point or interval where the curve approaches a straight line.

3. A method according to claim 2, wherein the change in resistance is measured by taking readings of the cumulative volume of feedstream passing through the filter over time.

4. A method according to claim 2, wherein the filter is a membrane and pressure sensing devices are positioned on either side of the filter to relate resistance changes in terms of trans-membrane pressure (TMP) drop.

5. An on-line method of monitoring and controlling a filtering system, said method comprising the steps of:
   i) determining a resistance value of filtering elements used in the filtering system by monitoring a number of operating parameters of the system;
   ii) calculating a feed fouling index (FFI) representative of the fouling characteristics of the feedstream with respect to the filtering system using the resistance value determined in i), where $$FFI = \frac{\Delta R}{\Delta(V/A)},$$

with FFI=Feed Fouling Index, $\Delta R$=change in resistance, V=volume of feedstream filtered and $\Delta(V/A)$=change in the ratio of volume of feedstream filtered to filter area; and
   iii) controlling operations of the filtering system in dependence on the value of the feed fouling index calculated.

6. An off-line method of determining the potential fouling effect of a feedstream, said method including the steps of:
   i) passing a sample of the feedstream at a predetermined pressure through a filter having known characteristics;

ii) determining a change in resistance to flow of the feedstream across the filter, either continuously or over a number of time intervals; and iii) using the information determined from step ii), calculating a feed fouling index (FFI) representative of fouling characteristics of the feedstream sample on the known filter, where $$FFI = \frac{\Delta R}{\Delta(V/A)},$$

with FFI=Feed Fouling Index, ΔR=change in resistance, V=volume of feedstream filtered and Δ(V/A)=change in the ratio of volume of feedstream filtered to filter area.

7. The method according to claim 6 wherein the filter is a membrane and further including the step of correlating the FFI with a second FFI calculated for a membrane filter for use in a filtration unit.

8. The method according to claim 6, wherein the change in resistance across the filter is plotted as a function of volume filtered and the FFI is calculated as the gradient of a curve so plotted at a point or interval where the curve approaches a substantially straight line.

9. The method according to claim 6 wherein the change in resistance of the filter is measured by recording, at a number of predetermined points in time, the cumulative volume of feedstream having passed through the filter.

10. The method according to claim 6 wherein pressure sensing devices are used to measure or estimate changes in resistance across the filter over time.

11. The method according to claim 6 wherein the FFI is calculated by a computer in response to entry of the resistance or pressure data.

12. The method according to claim 11 wherein the computer extrapolates from the entered data to provide a more accurate calculation of FFI.

13. An apparatus for use in determining the potential fouling effect of a feedstream comprising:
a filter having known properties;
means to pass a sample of the feedstream through said filter at a predetermined pressure;
means for measuring the change in resistance to flow of the feedstream through the filter over time; and
means for calculating quantitatively a feed fouling index (FFI) indicative of potential fouling effect of the feedstream on the filter based on the measured change in resistance to flow, where $$FFI = \frac{\Delta R}{\Delta(V/A)},$$

with FFI=Feed Fouling Index, ΔR=change in resistance, V=volume of feedstream filtered and Δ(V/A)=change in the ratio of volume of feedstream filtered to filter area, so as to estimate the potential fouling effect of the feedstream on other known filters.

14. Apparatus according to claim 13 wherein the means to pass the feedstream sample through the filter includes a container for holding the sample, and means for pressurising the sample within the container for delivery of the sample to the filter at a preselected pressure.

15. Apparatus according to claim 14 wherein the pressurising means is a manually operated pump.

16. Apparatus according to claim 13 or 14 wherein the container and pressurising means are provided in the form of a modified manually operated garden-spraying apparatus.

17. Apparatus according to claim 14 wherein the filter uses a filter element of the cellulose acetate type.

18. Apparatus according to claim 14 wherein one or more manually operable valves are provided to allow for priming and cleaning of the apparatus.

19. A method of monitoring the operation of a filtration system comprising the following steps:
a) sampling system parameter values at selected locations within the filtration system at a predetermined sampling rate;
b) generating a parameter profile characteristic from the sampled parameter values at predetermined intervals of time;
c) determining the change in resistance to flow of the feedstream across the filter, either continuously or over a number of time intervals, where $$R = \frac{\Delta P \times A}{\eta \times Q},$$

with R=resistance, ΔP=change in pressure across the filter, A=filter area, η=viscosity of the feedstream and Q=flow across the filter; and d) determining optimal operations of the filtration system using the information determined from steps a) to c).

20. A method according to claim 19 wherein the analysing step includes comparing the generated profile characteristic against a desired characteristic and identifying regions within the generated profile where the profile characteristic diverges from the desired characteristic.

21. An apparatus for monitoring the operation of a filtration system comprising:
a) means for sampling system parameter values at selected locations within the filtration system at a predetermined sampling rate;
b) means for generating a parameter profile characteristic from the sampled parameter values at predetermined intervals of time;
c) means for determining the change in resistance to flow of the feedstream across the filter, either continuously or over a number of time intervals, where $$R = \frac{\Delta P \times A}{\eta \times Q},$$

with R=resistance, ΔP=change in pressure across the filter, A=filter area, η=viscosity of the feedstream and Q=flow across the filter; and d) means for determining optimal operations of the filtration system using the information determined from means a) to c).

22. Apparatus according to claim 21 wherein the means for analysis includes means for comparing the generated profile characteristic against a desired characteristic and identifying regions within the generated profile where the profile characteristic diverges from the desired characteristic.

23. Apparatus according to claim 22 wherein as a result of the comparison, the analysis means indicates likely faults causing the divergence and suggests possible solutions so that the faults may be corrected or circumvented.

24. Apparatus according to claim 23 wherein a user is provided with an interactive display of the generated profile characteristic and the user can indicate an area of the generated profile characteristic the user is interested in and obtain details as to faults and solutions in regard to analysis of the area of the generated profile characteristic.

25. A method of monitoring and controlling a filtering system, said method comprising the steps of:
   i) determining resistance values of filtering elements used in the filtering system at predetermined times during the backwash cycle of the system by monitoring a number of operating parameters of the system;
   ii) calculating a backwash efficiency value representative of the efficiency of the backwash cycle of the filtering system using the resistance values determined in i), where $$BWE = 1 - \frac{R_3 - R_1}{R_2 - R_1} \times 100,$$

and BWE=backwash efficiency, and $R_i$=resistance at time i; and
   iii) controlling operations of the filtering system in dependence on the values of the backwash efficiency calculated.

26. A method according to claim 25 wherein the predetermined times during the backwash cycle are just after a previous backwash, just before a next backwash and just after said next backwash.

27. Apparatus for monitoring and controlling a filtering system comprising:

i) means for determining resistance values of filtering elements used in the filtering system at predetermined times during the backwash cycle of the system by monitoring a number of operating parameters of the system;
   ii) means for calculating a backwash efficiency value representative of the efficiency of the backwash cycle of the filtering system using the resistance values determined in i), where $$BWE = 1 - \frac{R_3 - R_1}{R_2 - R_1} \times 100,$$

and BWE=backwash efficiency, and $R_i$=resistance at time i; and
   iii) means for controlling operations of the filtering system in dependence on the values of the backwash efficiency calculated.

28. Apparatus according to claim 27 wherein the predetermined times during the backwash cycle are just after a previous backwash, just before a next backwash and just after said next backwash.

* * * * *